US009733984B2

(12) United States Patent
Caufield et al.

(10) Patent No.: US 9,733,984 B2
(45) Date of Patent: Aug. 15, 2017

(54) MULTIPLE STAGE WORKLOAD MANAGEMENT SYSTEM

(71) Applicant: International Business Machines Corporation, Armonk, NY (US)

(72) Inventors: Brian K. Caufield, Livermore, CA (US); Ron E. Liu, San Jose, CA (US); Sriram K. Padmanabhan, San Jose, CA (US); Mi W. Shum, San Jose, CA (US); Chun H. Sun, Beijing (CN); DongJie Wei, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/059,172

(22) Filed: Mar. 2, 2016

(65) Prior Publication Data

US 2016/0179578 A1      Jun. 23, 2016

Related U.S. Application Data

(63) Continuation of application No. 13/959,210, filed on Aug. 5, 2013, now Pat. No. 9,304,816.

(51) Int. Cl.
*G06F 9/46* (2006.01)
*G06F 9/50* (2006.01)
*G06F 9/48* (2006.01)

(52) U.S. Cl.
CPC ............ *G06F 9/505* (2013.01); *G06F 9/4881* (2013.01); *G06F 9/5038* (2013.01); *G06F 2209/485* (2013.01)

(58) Field of Classification Search
None
See application file for complete search history.

(56) References Cited

U.S. PATENT DOCUMENTS

| 6,772,407 | B1 | 8/2004 | Leymann et al. |
| 7,233,331 | B2 | 6/2007 | Kato |
| 7,739,418 | B2 | 6/2010 | Elkington et al. |
| 8,069,446 | B2 | 11/2011 | Zhao et al. |
| 8,245,238 | B2 | 8/2012 | Neubauer et al. |

(Continued)

OTHER PUBLICATIONS

IBM Corp., "Dynamically Throttling Workload Processing Based on Logical Resource Consumption", May 21, 2007, IPCOM000152992D, Downloaded from ip.com at <URL: http://ip.com/IPCOM/000152992>, Total 6 pp.

(Continued)

*Primary Examiner* — Emerson Puente
*Assistant Examiner* — Steven Do
(74) *Attorney, Agent, or Firm* — Janaki K. Davda; Konrad, Raynes, Davda & Victor LLP (57) ABSTRACT

Provided are techniques for multiple stage workload management. A staging queue and a run queue are provided. A workload is received. In response to determining that application resources are not available and that the workload has not been previously semi-started, the workload is added to the staging queue. In response to determining that the application resources are not available and that the workload has been semi-started, and, in response to determining that run resources are available, the workload is started. In response to determining that the application resources are not available and that the workload has been semi-started, and, in response to determining that the run resources are not available, adding the workload to the run queue.

18 Claims, 7 Drawing Sheets

(56) References Cited

U.S. PATENT DOCUMENTS

| | | |
|---|---|---|
| 2009/0122766 A1 | 5/2009 | Hughes et al. |
| 2009/0217288 A1 | 8/2009 | Neubauer et al. |
| 2009/0320032 A1 | 12/2009 | Avni et al. |
| 2011/0288900 A1 | 11/2011 | McQueen et al. |
| 2012/0167112 A1 | 6/2012 | Harris et al. |
| 2015/0040133 A1 | 2/2015 | Caufield et al. |

OTHER PUBLICATIONS

U.S. Appl. No. 13/538,854, filed Jun. 29, 2012, entitled, "Light Weight Workload Management Server Integration", by Caufield, B.K., Y. Li, and X. Pu, Total 82 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

Office Action 1, Jul. 30, 2015, for U.S. Appl. No. 13/959,210, filed Aug. 5, 2013 by B.K. Caufield et al., Total 17 pp.

Response to Office Action 1, Oct. 30, 2015, for U.S. Appl. No. 13/959,210, filed Aug. 5, 2013 by B.K. Caufield et al., Total 10 pp.

Notice of Allowance, Jan. 8, 2016, for U.S. Appl. No. 13/959,210, filed Aug. 5, 2013 by B.K. Caufield et al., Total 8 pp.

MULTIPLE STAGE WORKLOAD MANAGEMENT SYSTEM

FIELD

Embodiments of the invention relate to multiple stage workload management system.

BACKGROUND

Workload Management (WLM) systems are used to help control access to machine resources. Typically, WLM systems consist of monitors that are tracking the usage of the resources that they are monitoring and managing, work queues to store workloads that are not able to run immediately, and policies for determining which workload should run next. WLM systems may be implemented at low levels in a software stack, e.g. at an Operating System (OS) level or at lower levels.

Data integration may be described as extracting data from a source, transforming the data, and loading the data to a target. That is, data integration is Extract, Transform, Load (ETL) processing. Data integration processing engines may be scalable and capable of processing large volumes of data in complex data integration projects. It is common for multiple users (e.g., customers) and projects to share a single data integration processing engine that is responsible for handling all of the data integration processing for those multiple users. This high volume, highly concurrent processing may be resource intensive, and users try to balance the availability of system resources with the need to process large volumes of data efficiently and concurrently.

Due to the complexity of these environments, some data integration execution environments need application level workload management functionality, rather than low level (e.g., OS level) functionality. The resources that need to be managed may be application resources, which are a form of logical resources, as opposed to system resources (e.g., Central Processing Unit (CPU), memory, storage, etc.).

A WLM system may be designed to manage the number of workloads that are running concurrently, indirectly managing the machine resources required to run the workloads. The WLM system may also manage the number of workloads that are allowed to start in a given time window. These two aspects may be described as application resources that the WLM system is managing.

While managing application level resources, a WLM system itself uses some logical/application level resources in order to track and manage workloads (which may or may not be a resource that it is intended to manage). For example, the WLM system may prepare and hold incoming workloads, which may consume one or more application resources (while not placing much additional load on physical machine resources).

That is, the WLM system uses some resources to queue workloads for execution. It is possible that there are physical machine resources available to use, but the application's WLM system does not have resources to manage anymore workloads. For example, an application may have a logical resource ("slot") for handling 100 items that are executing, which exceeds what the physical machine can actually execute concurrently. With a WLM system in place, workloads may be queued up, which takes little additional machine resource, but may consume a logical resource, i.e. a "slot". When enough of these workloads are queued up, this logical resource may be exhausted.

Although there are machine resources available, when logical resources are exhausted, current WLM systems may become unstable and/or fail with unexpected error conditions.

In some cases, the WLM system reaches the state that no more workloads can be prepared, and the WLM rejects the workload outright. Then, the client may re-submit the workload at a later time.

In some other cases, the client automatically tries to re-submit the workload until the WLM system will take that workload. In such cases, it may be difficult to determine the frequency of re-submissions. Also, if multiple clients are trying to re-submit workloads, then any one of the clients may have its workload accepted by the WLM system, regardless of when or how often that client has re-submitted its workload. This can lead to situations where one submitted workload can wait for hours and not get into the WLM system, while another workload waits only seconds and takes a newly available slot. Moreover, the state of the workload is undefined in that the WLM system knows nothing about that workload until the workload is accepted by the WLM system. So, the WLM system will not report this workload as existing in a queue, and the WLM system does not utilize any of the WLM queue management functions on the workload (moving up in the queue, switching queues, cancelling the workload).

Also, more organization to the client re-submissions may added by creating a centralized queuing mechanism that is not managed by the WLM system.

SUMMARY

Provided is a method for multiple stage workload management. The method comprises providing, using a processor of a computer, a staging queue and a run queue; receiving a workload; in response to determining that application resources are not available and that the workload has not been previously semi-started, adding the workload to the staging queue; and in response to determining that the application resources are not available and that the workload has been semi-started, in response to determining that run resources are available, starting the workload, and, in response to determining that the run resources are not available, adding the workload to the run queue.

Provided is a computer program product for multiple stage workload management. The computer program product comprises a computer readable storage medium having program code embodied therewith, the program code executable by at least one processor to perform: providing a staging queue and a run queue; receiving a workload; in response to determining that application resources are not available and that the workload has not been previously semi-started, adding the workload to the staging queue; and in response to determining that the application resources are not available and that the workload has been semi-started, in response to determining that run resources are available, starting the workload, and, in response to determining that the run resources are not available, adding the workload to the run queue Provided is a computer system for multiple stage workload management. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform:

providing a staging queue and a run queue; receiving a workload; in response to determining that application resources are not available and that the workload has not been previously semi-started, adding the workload to the staging queue; and, in response to determining that the application resources are not available and that the workload has been semi-started, in response to determining that run resources are available, starting the workload, and, in response to determining that the run resources are not available, adding the workload to the run queue.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
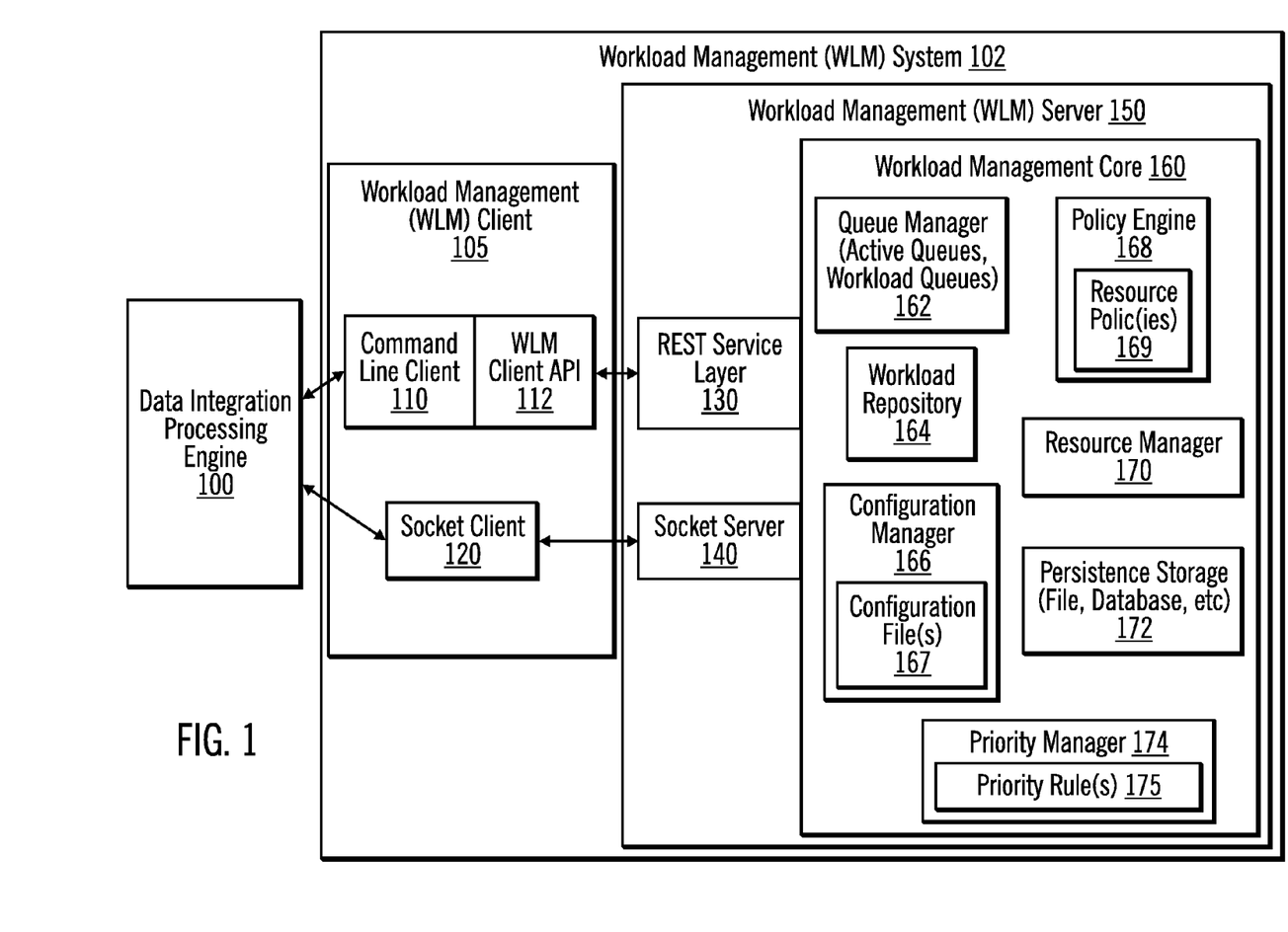
FIG. 1 illustrates a system architecture in accordance with certain embodiments.

FIG. 1 illustrates a system architecture in accordance with certain embodiments. A workload management (WLM) system 102 includes a workload management (WLM) client 105 and a workload management (WLM) server 150. The WLM client includes a command line client 110/WLMClient Application Programming Interface (API) 112 and a socket client 120.

In FIG. 1, a data integration processing engine 100 interacts with the (WLM) server 150. The data integration processing engine 100 processes data integration workloads (i.e., ETL workloads), and the WLM server 150 allows management of these data integration workloads using ETL metrics. In certain embodiments, a workload is a job.

The WLM server 150 includes a Representational State Transfer (REST) service layer 130, a socket server 140, and a workload management (WLM) core 160.

The data integration processing engine 100 is coupled to a command line client 110/WLMClient Application Programming Interface (API) 112. The data integration processing engine 100 is also coupled to a socket client 120. The command line client 110/WLMClient API are coupled to the REST service layer 130 at the WLM server 150. The socket client 120 is coupled to a socket server 140 at the WLM server 150. The workload management core 160 includes the following components: a queue manager 162 that manages, for example, active queues and workload queues; a workload repository 164 for storing workload information; a configuration manager 166; a policy engine 168; a resource manager 170; persistence storage 172 for storing a file, a database, etc.; and a priority manager 174.

The configuration manager 166 manages one or more configuration files 167. A configuration file 167 may be described as a file (e.g., an Extensible Markup Language (XML) file) containing class description, resource policies, priority rules, and system parameter settings.

The policy engine 168 manages the one or more resources policies 169. A resource policy 169 may be described as a policy for how physical and logical resources are to be used.

The priority manager 174 manages one or more priority rules 175. A priority rule 175 may be described as providing a technique for assigning a priority to a workload.

The workload management core 160 enables creation and management of ETL workloads via an asynchronous queuing mechanism. The workload management core 160 uses two-level abstraction to represent both logical and physical resources, grants users (e.g., applications executing at the data integration processing engine 100) control over workload priority and scheduling, and determines workload execution order based on three factors (at least one user-specified run schedule, at least one priority rule (i.e., either system provided or user-specified), and at least one resource policy).

Figure 2:
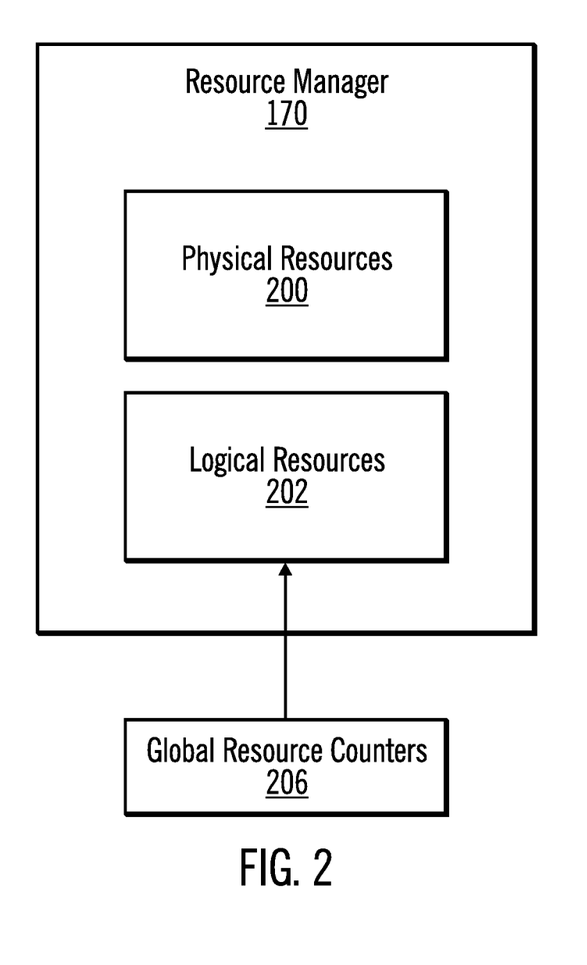
FIG. 2 illustrates further details of a resource manager in accordance with certain embodiments.

FIG. 2 illustrates further details of the resource manager 170 in accordance with certain embodiments. The resource manager 170 manages physical resources 200 and logical resources 202. The resource manager 170 checks the physical resources (e.g., to determine CPU usage and memory usage). The global resource counters 206 are stored for counting logical resources. In certain embodiments, one global resource counter is used to keep count of the number of workloads in all of the queues.

Embodiments include monitoring (e.g., tracking) application resources that are held by semi-started workloads. The WLM system monitors the application resources, along with the other logical resources that the WLM system is managing. The WLM system may also monitor the depth of queues and wait times to determine statistically whether a new workload is likely to wait in a queue long time.

In certain embodiments, the WLM system includes a WLM client and a WLM server. In certain embodiments, after a workload is submitted to the WLM system, the WLM system performs processing in two stages. In a first stage, the WLM client allocates application resources (e.g., a handle, locks on log files, etc., for the submitted workload). This is to guarantee a workload is allocated with sufficient logical resources and to enable faster start up when the workload is able to execute. The WLM client communicates with the WLM server to determine whether or not the workload can be run immediately or whether it will be queued. In the first stage, the workload is semi-started.

In the second stage, the WLM system sends the workload to the parallel engine that spawns processes (worker processes) corresponding to tasks or subtasks to complete the workload. In the second stage, the workload is fully started (as opposed to semi-started in stage 1). The WLM server places workloads in run queues during stage 1, based on workload classification rules. When the system resources are available and workload run policies are met, the WLM system sends the workload to stage 2.

Embodiments add a staging queue corresponding to each run queue. The staging queue is used to stage workloads when application resources needed to semi-start the workload become strained or to more efficiently manage workloads that are likely to be in a queue for a long period of time.

With embodiments, a preceding processing stage is added to the WLM system. When the WLM system detects that the application resources that are needed to semi-start the workload are becoming scarce, the WLM system may begin staging workloads in the staging queue, such that queuing the workloads in the WLM system does not place additional demand on the scarce application resources.

In particular, the WLM system obtains a workload that must be executed. If the WLM system decides a workload cannot run at the moment, the WLM system places the workload in a queue. If sufficient application resources exist, the workload is allowed to go through stage 1 and is placed in a run queue. The WLM system then decides on when the workload can go to stage 2 based on the policies and resource availability. When a workload is placed in a run queue by the WLM system, the workload holds application resources and is semi-started. If sufficient application resources needed to semi-start the workload do not exist, the workload is placed in a staging queue and is not allowed to go through stage 1. The WLM system decides when the workload can be semi-started and moved to a run queue based on the policies and application resources availability.

When a workload is run, the workload consumes application resources (e.g., a handle, locks on log files, etc.), as well as other resources, e.g. system resources. When a workload is semi-started, many of these application resources are allocated, which consumes these application resources all the while the workload is held in the WLM system run queue.

The WLM system tracks the usage of these application resources. Since the WLM system knows the amount of application resources that are required to queue workloads and knows how many workloads are queued, the WLM system tracks the usage and detects when the application resources have become scarce or exhausted.

Figure 3:
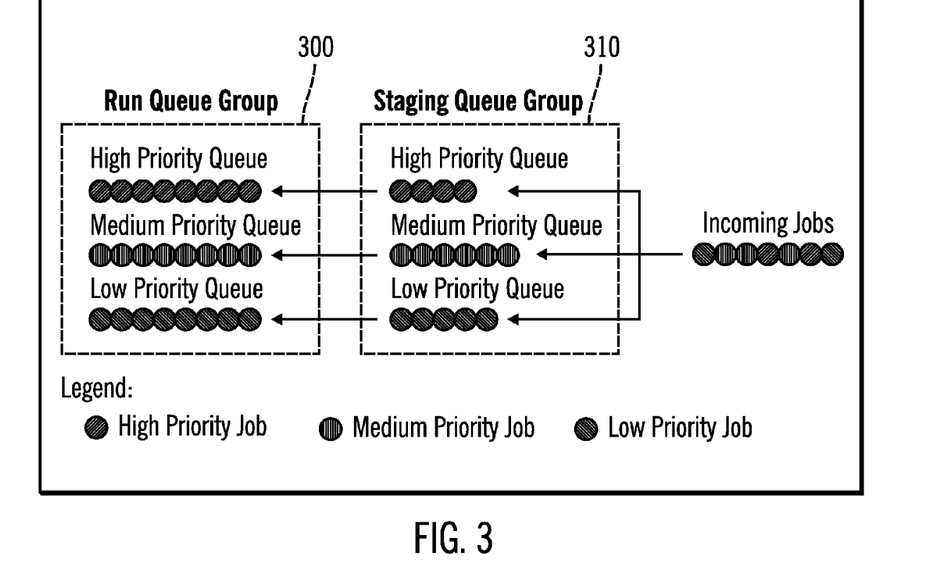
FIG. 3 illustrates a run queue group and a staging queue group in accordance with certain embodiments.

FIG. 3 illustrates a run queue group 300 and a staging queue group 310 in accordance with certain embodiments. The run queue group 300 includes one or more run queues associated with different priorities. The staging queue group 310 includes one or more staging queues associated with different priorities. In certain embodiments, there is one staging queue for each run queue.

There are multiple stages in the WLM system. The run queue group 300 includes the workloads that are actively tracked and managed by the WLM system. The WLM system submits workloads (based on priority rule setting, etc.) in the run queue group 300 to run when system resources (e.g., CPU, memory, storage, etc.) become available.

The queues created in the staging queue group 310 mirror the queues created in the run queue group 300. The WLM system places workloads in queues in the staging queue group 310 when application resources are exhausted or statistically these workloads will not be sent to run in a relatively long period of time (e.g., workloads in the back of a long queue). If application resources are available, workloads submitted to the WLM system pass through the staging queue group 310 and go immediately to the run queue group 300.

Workloads in the staging queue group 310 do not consume application resources (e.g., handles, locks on log files, etc.). Statistically, these workloads will not be sent to run immediately. The WLM system does not track and manage the workloads in the staging queue group 310 actively. Workloads in the queues of the staging queue group 310 are considered in "sleep" state by the WLM system. Hence, it is very light-weight for the WLM system to manage workloads in the staging queue group 310.

Furthermore, as opposed to workloads in the run queue group 300 that hold application resources, workloads in the staging queue group 310 do not hold these resources. So application resources will unlikely be exhausted provided a pre-calculated and fixed number of slots are allowed in the run queue group 300 that are within the capacity of the logical resources.

After the WLM system submits a workload in the run queue group 300 to run, and the workload finishes, logical resources for a workload become available. Then, the WLM system moves a workload from the staging queue group 310 to the run queue group 300.

When a workload is moved from the staging queue group 310 to the run queue group 300, the workload goes to the same priority queue. In this manner, priority of a workload is preserved.

With embodiments, the group 300, 310 into which the workload is placed is transparent to an application that is sending the workload to the WLM system.

Figure 4:
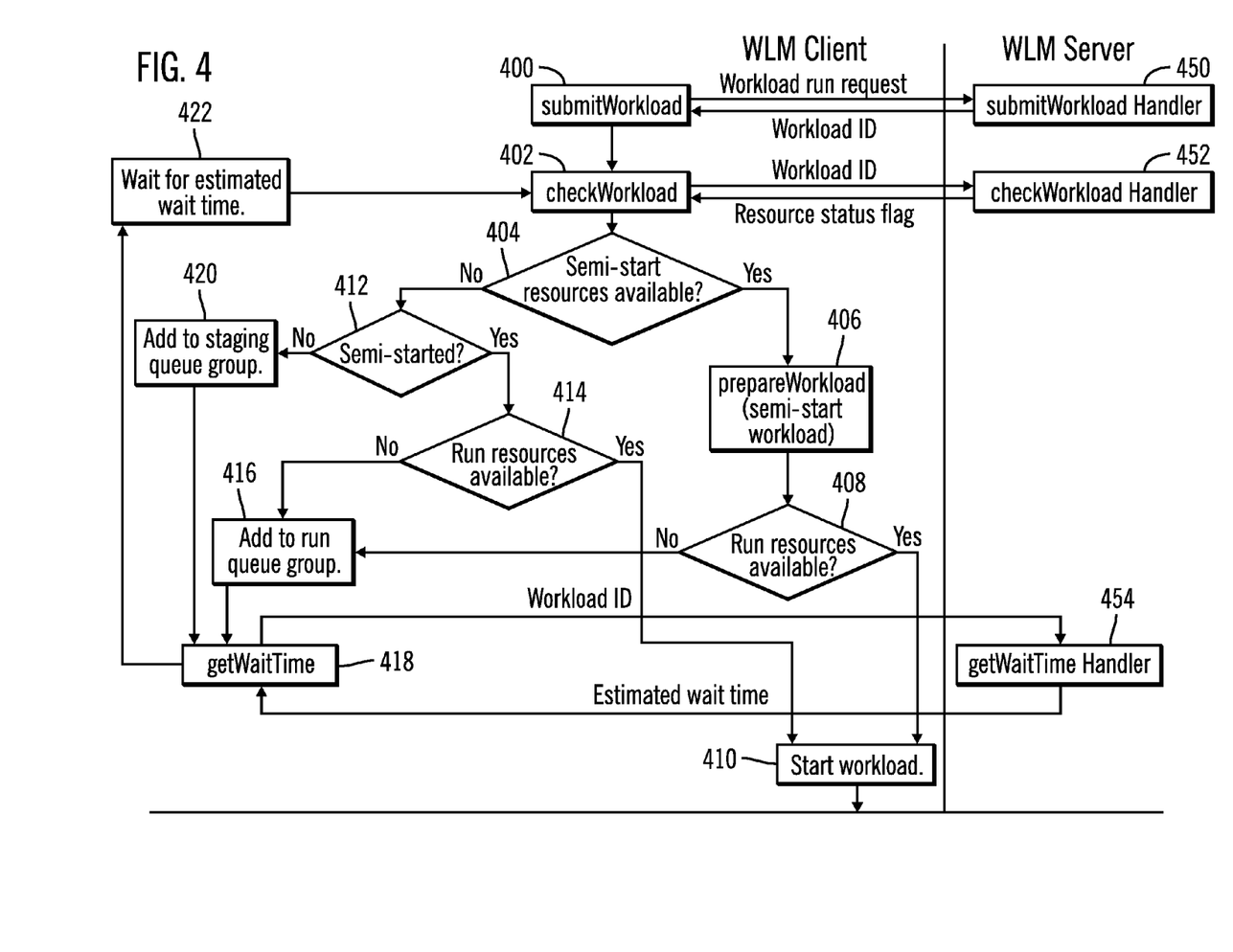
FIG. 4 illustrates, in a flow diagram, operations performed to process workloads in a WLM client/WLMserver model in accordance with certain embodiments.

FIG. 4 illustrates, in a flow diagram, operations performed to process workloads in a WLM client/WLMserver model in accordance with certain embodiments. Control begins with the WLM client calling submitWorkload (block 400) to submit a workload run request to the WLM server. The submitWorkload handler returns a workload identifier (ID) to the WLM client (block 450). Workloads have not been prepared (or semi-started) in this stage.

The WLM client calls checkWorkload, which contacts the WLM server with the workload ID (block 402). The checkWorkload handler returns a resource status flag to the WLM client (block 452).

In certain embodiments, the resource status flag may be one of the following return codes of Table 1:

TABLE 1

| Return Code | Application Resources Available? | Run Resources Available? |
|---|---|---|
| 4 | Yes | Yes |
| 2 | Yes | No |
| 1 | No | Yes |
| 0 | No | No |

In block 404, the WLM server determines whether application resources needed to semi-start the workload are available using the resource status flag, or whether the expected wait time in the queue is long and flags the WLM client as to the status. If so, processing continues to block 406, otherwise, processing continues to block 412. In block 406, the WLM client calls prepareWorkload to semi-start the workload. In block 408, the WLM client determines whether run resources are available. If so, processing continues to block 410, otherwise, processing continues to block 416. In block 410, the WLM client starts the workload.

If application resources are not available at block 404, processing continues to block 412. In block 412, the WLM client determines whether the workload has been semi-started. If so, processing continues to block 414, otherwise, processing continues to block 420. In block 414, the WLM client determines whether run resources are available. If so, processing continues to block 410, otherwise, processing continues to block 416. In block 416, the workload is added to a run queue in the run queue group based on a priority of the workload. From block 416, processing continues to block 418. In block 418, the WLM client calls getWaitTime, which contacts the WLM server with the workload ID. The getWaitTime Handler returns an estimated wait time (e.g., in seconds) to the WLM client (block 454). From block 418, processing continues to block 422 to wait the estimated wait time. Then, processing continues from block 422 to block 402.

If the workload has not been semi-started at block 412, processing continues to block 420. In block 420, the WLM client adds the workload to a staging queue in the staging queue group. From block 420, processing continues to block 418.

Thus, if the return code=4 (both application resources and run resources are available), this leads to the "Yes" branch of block 404 being followed. Function prepareWorkload will be called to semi-start the workload. If the workload has been semi-started previously, prepareWorkload does not need to perform any additional processing. Also, the "Yes" branch of block 408 is followed, and the workload is sent to run.

If the return code=2 (application resources are available but run resources are not available), this leads to the "Yes" branch of block 404 being followed. Function prepareWorkload will be called to semi-start the workload. If the workload has been semi-started previously, prepareWorkload does not need to perform any additional processing. Also, the "No" branch of block 408 is followed, and the workload is placed in the run queue group.

If the return code=1 (application resources are not available and run resources are available), this leads to the "No" branch of block 404 being followed. Then, if the workload has not been semi-started, this leads to the "No" branch of block 412 being followed, and the workload is placed in the staging queue group. However, if the workload has been previously semi-started, this leads to the "Yes" branch of block 412 and the "Yes" branch of block 414, and the workload is sent to run.

If the return code=0 (neither application resources nor run resources are available), this leads to the "No" branch of block 404 being followed. Then, if the workload has not been semi-started previously, this leads to the "No" branch of block 412 being followed, and the workload is placed in the staging queue group. However, if the workload has been semi-started previously, this leads to the "Yes" branch of block 412 and the "No" branch of block 414 being followed, and the workload is placed in the run queue group.

In certain embodiments, for workloads that cannot be run, the WLM client calls the checkWorkload handler to get an estimated wait time, Nwait, waits Nwait amount of time (e.g., seconds), and calls checkWorkload.

Thus, embodiments create a mechanism such that the WLM system can stage a workload in a different way when the application resources the WLM system needs to operate become scarce. That is, the WLM system can stage the workload proactively to avoid an application resource shortage.

Embodiments better control logical resources required for workload startup. Embodiments determine whether a job should be staged, semi-started or run immediately. Embodiments provide a two-phase queuing mechanism to better control logical resource allocation.

In certain embodiments, an extension to a client-server based workload management system that is controlling the starting of parallel data flows is provided. In such embodiments, a technique for queuing work within the workload management system utilizes 'hybrid queues'. The first part of the queue (the run queue) contains workloads that are in a 'semi-started' state (e.g., some amount of preparation has been done, such that the workload is ready to run), and workloads in this state use some amount of resource (logical and physical). The second part of the queue (the staging queue) contains workloads that are not started at all (but are intended to be run). These 2 queues together form a single queue from the perspective of the WLM system. This technique allows the WLM system to continue to queue up work, even when the resources it needs to store workloads in the prepared state are not available, while not introducing additional complexities into the overall management, configuration, and usage of the WLM system since all of the WLM policies, workload classification, and queue management functions continue to work with these queues.

Cloud Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
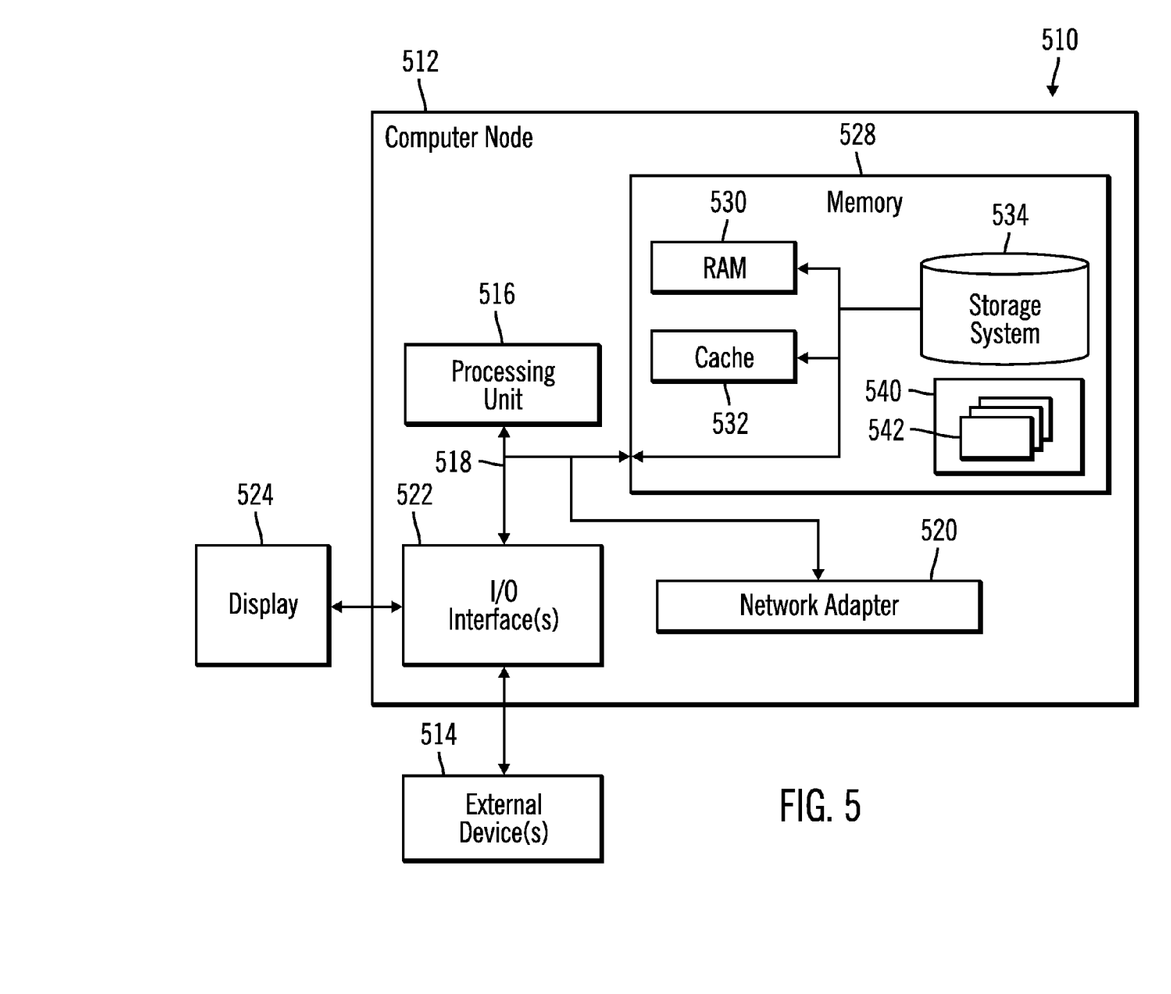
FIG. 5 illustrates a cloud computing node in accordance with certain embodiments.

Referring now to FIG. 5, a schematic of an example of a cloud computing node is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to a processor or processing unit 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
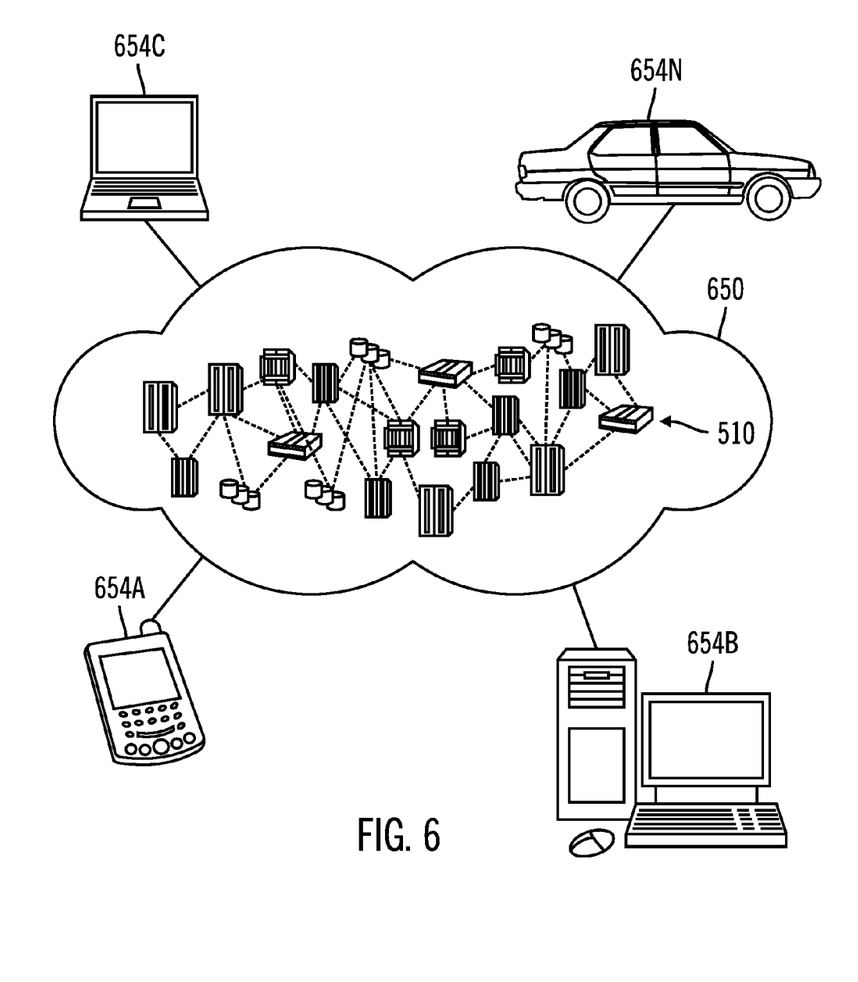
FIG. 6 illustrates a cloud computing environment in accordance with certain embodiments.

Referring now to FIG. 6, illustrative cloud computing environment 650 is depicted. As shown, cloud computing environment 650 comprises one or more cloud computing nodes 510 with which local computing devices used by cloud consumers, such as, for example, personal digital assistant (PDA) or cellular telephone 654A, desktop computer 654B, laptop computer 654C, and/or automobile computer system 654N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 510 and cloud computing environment 650 can communicate with any type of computerized device over any type of network and/or network addressable connection (e.g., using a web browser).

Figure 7:
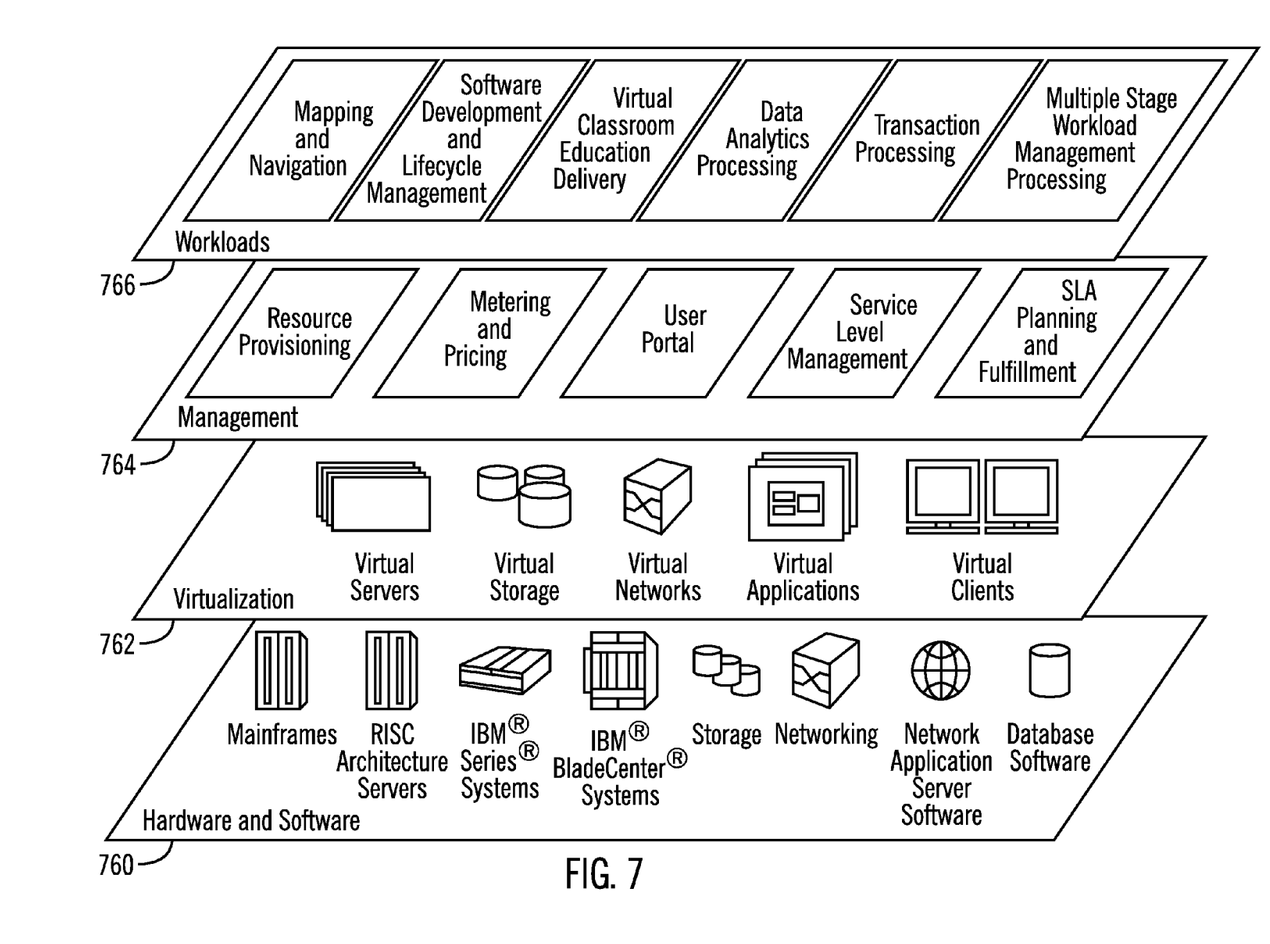
FIG. 7 illustrates abstraction model layers in accordance with certain embodiments.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and multiple stage workload management processing.

Thus, in certain embodiments, software or a program, implementing multiple stage workload management processing in accordance with embodiments described herein, is provided as a service in a cloud environment.

In certain embodiments, the data integration processing engine 100 and/or the WLM server 150 has the architecture of computing node 510. In certain embodiments, the data integration processing engine 100 and/or the WLM server 150 is part of a cloud environment. In certain alternative embodiments, the data integration processing engine 100 and/or the WLM server 150 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A method, comprising:
   providing, using a processor of a computer, multiple staging queues having priorities with corresponding multiple run queues having corresponding priorities;
   receiving a workload having a priority;
   receiving a resource status flag that is set to indicate whether application resources are available and whether run resources are available for the workload;
   in response to determining that application resources are not available using the resource status flag and that the workload has not been previously semi-started, adding the workload to a staging queue of the multiple staging queues having a same priority as the workload; and
   in response to determining that the application resources are not available using the resource status flag and that the workload has been semi-started;
   in response to determining that run resources are available using the resource status flag, starting the workload; and
   in response to determining that the run resources are not available using the resource status flag, adding the workload to a run queue of the multiple run queues from the staging queue, wherein the run queue has the same priority as the staging queue.

2. The method of claim 1, further comprising:
   in response to determining that the application resources are available using the resource status flag,
   preparing the workload;
   in response to determining that the run resources are available using the resource status flag, starting the workload; and
   in response to determining that the run resources are not available using the resource status flag, adding the workload to the run queue.

3. The method of claim 1, wherein the multiple staging queues form a staging queue group, wherein each of the multiple staging queues has a different priority, wherein the multiple run queues form a run queue group, wherein each of the multiple run queues has a different priority, and wherein a workload is moved from one of the multiple staging queues having a priority to one of the multiple run queues having a same priority.

4. The method of claim 1, wherein the application resources comprise logical resources.

5. The method of claim 1, further comprising:
   obtaining an estimated wait time; and
   after waiting the estimated wait time, checking the resource status flag of the workload to determine whether the application resources and the run resources are available.

6. The method of claim 1, wherein a Software as a Service (SaaS) is provided to perform method operations.

7. A computer program product, the computer program product comprising a non-transitory computer readable storage medium having program code embodied therewith, the program code executable by at least one processor to perform:
   providing multiple staging queues having priorities with corresponding multiple run queues having corresponding priorities;

receiving a workload having a priority;
receiving a resource status flag that is set to indicate whether application resources are available and whether run resources are available for the workload;
in response to determining that application resources are not available using the resource status flag and that the workload has not been previously semi-started, adding the workload to a staging queue of the multiple staging queues having a same priority as the workload; and
in response to determining that the application resources are not available using the resource status flag and that the workload has been semi-started;
   in response to determining that run resources are available using the resource status flag, starting the workload; and
   in response to determining that the run resources are not available using the resource status flag, adding the workload to a run queue of the multiple run queues from the staging queue, wherein the run queue has the same priority as the staging queue.

8. The computer program product of claim 7, wherein the program code is executable by at least one processor to perform:
in response to determining that the application resources are available using the resource status flag,
   preparing the workload;
   in response to determining that the run resources are available using the resource status flag, starting the workload; and
   in response to determining that the run resources are not available using the resource status flag, adding the workload to the run queue.

9. The computer program product of claim 7, wherein the multiple staging queues form a staging queue group, wherein each of the multiple staging queues has a different priority, wherein the multiple run queues form a run queue group, wherein each of the multiple run queues has a different priority, and wherein a workload is moved from one of the multiple staging queues having a priority to one of the multiple run queues having a same priority.

10. The computer program product of claim 7, wherein the application resources comprise logical resources.

11. The computer program product of claim 7, wherein the program code is executable by at least one processor to perform:
obtaining an estimated wait time; and
after waiting the estimated wait time, checking the resource status flag of the workload to determine whether the application resources and the run resources are available.

12. The computer program product of claim 7, wherein a Software as a Service (SaaS) is configured to perform computer program product operations.

13. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform:
   providing multiple staging queues having priorities with corresponding multiple run queues having corresponding priorities;
   receiving a workload having a priority;
   receiving a resource status flag that is set to indicate whether application resources are available and whether run resources are available for the workload;
   in response to determining that application resources are not available using the resource status flag and that the workload has not been previously semi-started, adding the workload to a staging queue of the multiple staging queues having a same priority as the workload; and
   in response to determining that the application resources are not available using the resource status flag and that the workload has been semi-started;
      in response to determining that run resources are available using the resource status flag, starting the workload; and
      in response to determining that the run resources are not available using the resource status flag, adding the workload to a run queue of the multiple run queues from the staging queue, wherein the run queue has the same priority as the staging queue.

14. The computer system of claim 13, further comprising program instructions, stored on the at least one of the one or more computer-readable, tangible storage devices for execution by the at least one of the one or more processors via at least one of the one or more memories, to perform:
in response to determining that the application resources are available using the resource status flag,
   preparing the workload;
   in response to determining that the run resources are available using the resource status flag, starting the workload; and
   in response to determining that the run resources are not available using the resource status flag, adding the workload to the run queue.

15. The computer system of claim 13, wherein the multiple staging queues form a staging queue group, wherein each of the multiple staging queues has a different priority, wherein the multiple run queues form a run queue group, wherein each of the multiple run queues has a different priority, and wherein a workload is moved from one of the multiple staging queues having a priority to one of the multiple run queues having a same priority.

16. The computer system of claim 13, wherein the application resources comprise logical resources.

17. The computer system of claim 13, further comprising program instructions, stored on the at least one of the one or more computer-readable, tangible storage devices for execution by the at least one of the one or more processors via at least one of the one or more memories, to perform:
obtaining an estimated wait time; and
after waiting the estimated wait time, checking the resource status flag of the workload to determine whether the application resources and the run resources are available.

18. The computer system of claim 13, wherein a Software as a Service (SaaS) is provided to perform system operations.

* * * * *